(12) United States Patent
Ellis et al.

(10) Patent No.: US 7,440,905 B2
(45) Date of Patent: Oct. 21, 2008

(54) INTEGRATIVE RISK MANAGEMENT SYSTEM AND METHOD

(75) Inventors: David Ellis, London (GB); Richard Higgs, Ashtead (GB); Michael King, London (GB); Tom Teixeira, Bristol (GB); Tzanko Tzanev, London (GB); Darren Wogan, London (GB); Howard Weiner, London (GB)

(73) Assignee: Strategic Thought Limited, London (GB)

( * ) Notice: Subject to any disclaimer, the term of this patent is extended or adjusted under 35 U.S.C. 154(b) by 900 days.

(21) Appl. No.: 09/977,050

(22) Filed: Oct. 12, 2001

(65) Prior Publication Data
US 2002/0138318 A1 Sep. 26, 2002

(30) Foreign Application Priority Data
Oct. 12, 2000 (GB) .................................. 0025066.2

(51) Int. Cl.
*G06F 9/44* (2006.01)
(52) U.S. Cl. .......................................................... 705/7
(58) Field of Classification Search ....................... 705/7
See application file for complete search history.

(56) References Cited

U.S. PATENT DOCUMENTS

| | | | | |
|---|---|---|---|---|
| 5,586,252 | A * | 12/1996 | Barnard et al. | 714/48 |
| 5,930,762 | A | 7/1999 | Masch | 705/7 |
| 6,088,678 | A * | 7/2000 | Shannon | 705/8 |
| 6,219,805 | B1 * | 4/2001 | Jones et al. | 714/38 |
| 6,237,915 | B1 * | 5/2001 | Ledet et al. | 273/236 |
| 6,370,573 | B1 * | 4/2002 | Bowman-Amuah | 709/223 |
| 6,397,202 | B1 * | 5/2002 | Higgins et al. | 706/47 |
| 6,662,357 | B1 * | 12/2003 | Bowman-Amuah | 717/120 |
| 6,718,342 | B1 * | 4/2004 | Schultz et al. | 707/104.1 |
| 7,212,986 | B1 * | 5/2007 | Richardson et al. | 705/9 |
| 7,222,330 | B2 * | 5/2007 | Bicknell et al. | 717/101 |

FOREIGN PATENT DOCUMENTS

| EP | WO 01/40984 A1 | 6/2001 |
|---|---|---|
| GB | 2 218 834 A | 11/1989 |

(Continued)

OTHER PUBLICATIONS

Archived version of www.palisade.com's product description of @Risk features and functions, Jan. 19, 2000.*

(Continued)

*Primary Examiner*—C. Michelle Tarae
(74) *Attorney, Agent, or Firm*—Westman, Champlin & Kelly, P.A.

(57) ABSTRACT

There is disclosed an integrated project management and risk management system. A risk processor has access to a project data store containing a plurality of inter-related project actions used for project management purposes, and a risk data store which contains a plurality of inter-related project activities and associated risk indicators used for related risk management purposes. The risk processor is operable to generate and write to the risk data store changes to the project activities and risk indicators reflecting changes in the project actions, to generate or receive mitigating activities identified to reduce or prevent a risk or the consequences of a risk associated with a project activity and to write corresponding project action changes to the project data store.

18 Claims, 2 Drawing Sheets

FOREIGN PATENT DOCUMENTS

| JP | 2000011048 A | 1/2000 |
|---|---|---|
| JP | 20000200303 A | 1/2002 |

OTHER PUBLICATIONS

Cummings, Nigel. "@Risk delivers richer picture," OR Newsletter, Feb. 1999.*

Marsh, Thomas. "Palisade upgrades @Risk Software," Corporate Finance, Sep. 1998.*

Finley, Eric et al. "Project Scheduling Risk Assessment Using Monte Carlo Methods," Cost Engineering, Oct. 1994.*

Boehm, Barry. "Software Risk Management: Principles and Practices," Defense Advanced Research Project Agency, Jan. 1991.*

Hulett, David. "Schedule Risk Analysis Simplified," PM Network, Jul. 1996.*

SCRAM Professional Analysis Services, archived version from www.archive.org, Apr. 2000.*

"Strategic Thought Limited: Strategic Thought launches first web-based risk management solution; Demand for Active Risk Management software increases as organizations seek to reduce corporate risk in multiple large-scale projects across the enterprise," M2 Presswire, Sep. 13, 2000.*

Royer, Paul. "Risk management: The undiscovered dimension of project management," Project Management Journal, Mar. 2000.*

Dawood, Nashwan. "Estimating project and activity duration: a risk management approach using network analysis," Division of Civil Engineering and Building, School of Science and Technology, The University of Teesside, Middlesborough TS1 3BA, UK, Aug. 14, 1997.*

Chapman, Chris. "Project risk analysis and management—PRAM the generic process," International Journal of Project Management, 1997.*

Jurison, Jaak. "Software Project Management: The Manager's View," Graduate School of Business Fordham University, 1999.*

* cited by examiner

INTEGRATIVE RISK MANAGEMENT SYSTEM AND METHOD

The present application claims priority on United Kingdom Application 0025066.2, filed Oct. 12, 2000, and entitled "INTEGRATIVE RISK MANAGEMENT SYSTEM AND METHOD."

FIELD OF THE INVENTION

The present invention relates to an integrative risk management system and a method thereof and particularly, but not exclusively, to a risk management system in which the risks arising from a plurality of separate, but related, projects can be automatically managed in a centralised manner.

BACKGROUND OF THE INVENTION

Risk management fundamentally consists of assigning to a nested structure of projects and their associated activities at least a cost and a time and then identifying risks and the impact of such risks on the cost and time assigned to each particular activity and project the same risk could affect more than one activity or project but may have differing levels of impact. Where a risk has an impact on the cost of an activity, for example, then the analysis can be performed against each activity independently. If, on the other hand, a risk has an impact on time, then the analysis of the impact must feed through the entire project structure. For each risk that is identified, mitigating plans are identified and put in place to reduce or prevent the risk. The mitigating plans are generally in the form of a series of actions that are to be followed The mitigating plans could have the effect of reducing the probability of the risk arising or of reducing the extent of the risk's impact on a particular activity or project.

Increasingly, companies are turning to risk management to identify and implement ways of reducing their exposure to risk, especially in large-scale projects. Various risk management software products have been developed to assist in this, much of the software being specifically for use in risk management in the medical field. Development of risk management systems has focused on ways of automating the analysis of risk and identification of mitigating actions. For example, U.S. Pat. No. 5,9307,62 describes risk management software which is capable of automatically identifying appropriate mitigating actions in response to an identified risk. However, commonly, those having responsibility for the management of risk in large scale projects have not been part of the day-to-day management of the projects involved. As a result, risk management software has remained a stand-alone software product.

Especially for large-scale projects, it has been realised that the separation of risk management and project management is not ideal. Firstly, such separation results in unnecessary duplication of work. More importantly, where there is a separation of risk management and project management, poor communication can result in changes in a project not being accommodated in the modelling of the risk for that project and in actions, identified as best mitigating a risk, not being implemented in the project.

SUMMARY OF THE INVENTION

The present invention therefore seeks to provide an integrative risk management system that overcomes at least some of the disadvantages outlined above and in particular is capable of integrating with project management systems. The present invention is especially, but not exclusively, concerned with providing a risk management system and method that is suitable for use with multiple projects at multiple sites, remote from one another.

The invention provides an integrated project management and risk management apparatus comprising:

a project data store containing a plurality of inter-related project actions;

a risk data store containing a plurality of inter-related project activities related to said project actions, and a plurality of risk indicators associated with said project activities; and a risk processor in communication with said project data store and said risk data store, said risk processor being operable to:

read project actions from said project data store;

read project activities and associated risk indicators from said risk data store;

generate and write to said risk data store changes to said project activities and risk indicators to reflect the project actions read from the project data store;

generate or receive, and write to said risk data store, one or more mitigating activities identified to reduce or prevent a risk or the consequences of a risk associated with a project activity; and generate and write to the project data store one or more new project actions, or alterations to existing project actions, corresponding to the mitigating activities generated or received.

The invention also provides corresponding software for execution by the risk processor, and a computer readable medium or media carrying such software.

The invention also provides risk management software comprising a set of instructions for the following steps to be performed when the software is executed:

a) accessing project data consisting of a plurality of actions to be performed;

b) analysing the project data to identify a plurality of activities to at least some of which is assigned at least one risk indicator;

c) on the basis of one or more mitigating tasks identified to reduce or prevent a risk or the consequences of a risk, outputting to the project data one or more new actions or alterations to existing actions in the project data; and d) accessing changes to the project data and revising the plurality of activities in dependence on whether the changes are to actions in the project data resulting from step c),above.

Preferably, the changes to the project data are compared with new actions or alterations to existing actions previously output to the project data and where the changes to project data relate to actions previously output to the project data no revisions are made to the plurality of activities. Moreover, the software may receive a trigger from the product data so that it knows when the project data has been changed. Alternatively, the software may periodically poll the project data to determine whether changes have been made to the project data.

In a preferred embodiment the risk management software comprises the further step of automatically outputting a message to a predetermined recipient when the consequences of a risk are identified as exceeding a selected threshold. Also a message may be automatically output to one or more predetermined recipients when the processor receives notice of an impacted risk.

In a further aspect the present invention provides risk management apparatus comprising a risk processor; means for linking the risk processor to a risk data store; a project data interface for linking the risk processor to a second store containing project data; and a program store containing a set of instructions for performing the following functions:

a) accessing project data in the second store, the project data consisting of a plurality of actions to be performed;

b) analysing the project data to identify a plurality of activities to at least some of which is assigned at least one risk indicator and storing the plurality of activities in the risk data store;

c) on the basis of one or more mitigating tasks identified to reduce or prevent a risk or the consequences of a risk, outputting to the second store one or more new actions or alterations to existing actions in the project data; and d) accessing changes to the project data and revising the plurality of activities stored in the risk data store in dependence on whether the changes are to actions in the project data resulting from step c) above.

Ideally, the risk data store and the second store utilise the same database. Alternatively, a network interface may be provided for connecting to the second store when located at a remote site.

Ideally, the functionality of the apparatus is divided into at least three parts: a presentational part for managing the presentation of risk information to a user of the apparatus; a logic part for analysing the project data and for generating and updating the contents of the risk data store; and an interface part for enabling communication of the apparatus with external applications and wherein the presentational part and the interface part are restricted to only interfacing internally with the logic part. A fourth part may be included consisting of a risk data store interface which is permitted to interface with both the logic part and the interface part.

In another aspect the present invention provides a risk management method for storing and updating risk information, comprising the steps of:

a) accessing project data consisting of a plurality of actions to be performed;

b) analysing the project data to identity a plurality of activities to at least some of which is assigned at least one risk indicator;

c) on the basis of one or more mitigating tasks identified to reduce or prevent a risk or the consequences of a risk, outputting to the project data one or more new actions or alterations to existing actions in the project data; and d) accessing changes to the project data and revising the plurality of activities in dependence on whether the changes are to actions in the project data resulting from step c) above.

Thus, with the present invention, it is possible for risk to be managed from a central system which automatically accesses and utilises project management data on a global basis, therefore making it suitable for use with projects involving a consortium of different enterprises. Furthermore, the integrative risk management system of the present invention is capable of being proactive with respect to changes in the one or more projects for which risk is being managed.

A risk indicator may be, in particular, a cost allowance or a time allowance. However, other risk indicators such as quality or performance or indeed any other suitable and possibly user defined indicator could be used.

BRIEF DESCRIPTION OF THE DRAWINGS

An embodiment of the present invention will now be described by way of example with reference to and as shown in the accompanying drawings, in which.

DETAILED DESCRIPTION OF THE PREFERRED EMBODIMENT

Figure 1:
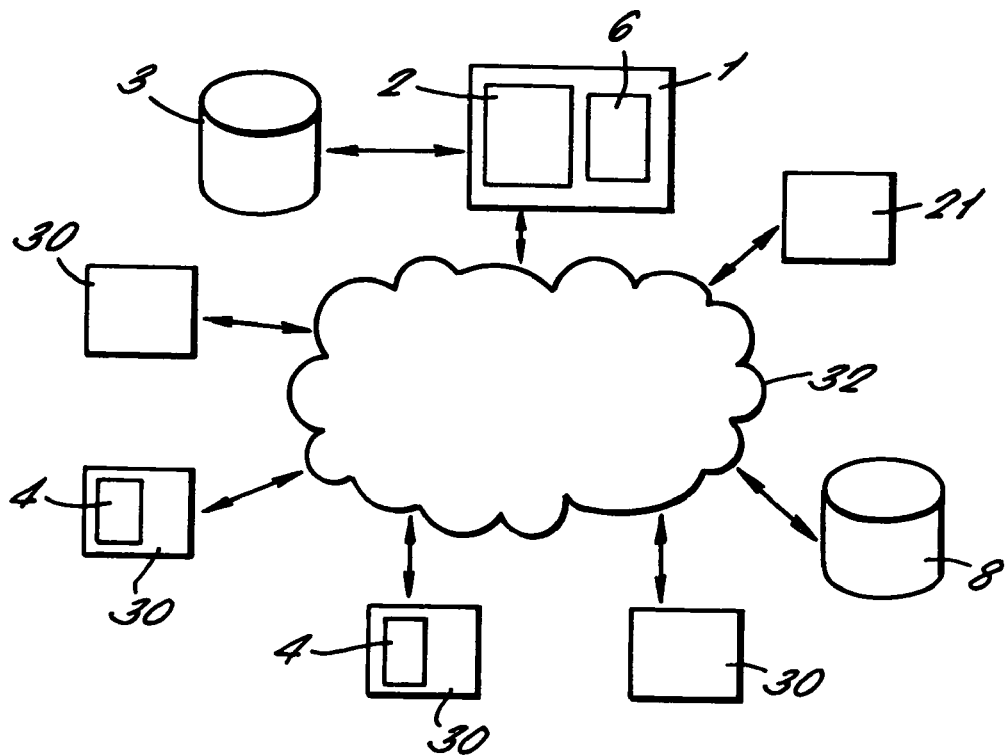
FIG. 1 is a schematic illustration of an integrated project management and risk management system.

With reference to FIG. 1, in large-scale implementation of the integrated project management and risk management system for example for a multi-national company, in practice the risk management system 1 including a risk processor 2 will be at a first location, for example head office, and in communication with a risk data store 3 which is either part of the same machine as the processor 2 or may be elsewhere, in which case communication of the processor 2 with the data store 3 is via a communications link which may be provided by, for example, a local or wide area network. A large number of workstations 30, away from the first location, are also capable of communication with the risk processor 2 via similar communications links 32 which may, at least in part, be provided by the publically accessible Internet. Preferably, each workstation 30 is provided with standard Internet/HTML web browser software to enable the workstation to interrogate and update the risk management system and read and update risk information from the risk data store 3. Additionally, at least some of the remote workstations 30 include project management systems 4. Project data in the form of a series of nested actions and their statuses is stored by the project management systems 4 or in one or more separate project databases 8, along with information on the status of the actions. Instead of being distant, one or more of the project management systems may be collocated with, or even running on the same computer system as the risk processor 2.

The risk management system 1 is able to automatically interrogate the project management systems 4 or project databases 8 and retrieve the project data. This project data is used by the risk management system in the construction of a conventional activity breakdown structure which consists of the projects and their associated activities, ordered in a nested arrangement, with a respective cost and time assigned to each project and activity, as mentioned earlier. The risk management system 1 is similarly capable of identifying and retrieving changes to individual managed projects and adjusting the activity breakdown structure accordingly. The identification and retrieval by the risk management system of changes to an existing managed project is described in greater detail below.

All potential risks are then identified and the impact of the risks on the cost and time assigned to each activity and each project is determined along with suitable mitigating actions. The identification of risks and mitigating actions may be performed manually and the data entered into the risk management system or the risk management system may include functionality to identify risks and mitigating actions automatically.

Once the mitigating actions have been identified and the risk for each project and activity adjusted to account for the implementation of mitigating actions, where appropriate, risk or mitigating action assignments are then automatically communicated by the risk management system, ideally via e-mail using an e-mail interface 6, to the relevant project managers via their remote workstations. As a result of these new assignments, individual projects may be altered resulting in changes to the project data. The risk management system may also update, or cause to be updated, the project data automatically or directly. These changes, like all other changes to the managed projects are identified by the risk management system as mentioned above. However, where these changes reflect mitigating actions that were originally identified by the risk management system, the changes are not used to update the activity breakdown structure. This is necessary to avoid the development of a continuous loop of adjustments attracting further adjustments, and so on.

The exchange of data between the project management systems 4 and the risk management system 1 may be achieved by means of a mapping table 21 that may be stored with the risk management system. The mapping table 21 may additionally be used to record changes to the managed project. In this way a polling function may be implemented by the risk management system 1 to interrogate the mapping table on a regular basis, e.g. once a day or once an hour to identify any new additions to the mapping table representing changes to the managed project. Any new additions that are identified are then read by the risk management system and compared against the mitigating actions and activities which are already known to the system. Where an addition is found to represent a change to a managed project that does not result from a mitigating action, the activity breakdown structure stored in the risk database 3 is updated to reflect the change.

When an event that has been identified as a risk occurs, that is to say it is impacted, this is entered into the risk management system. The risk management system then automatically issues messages, ideally in the form of e-mail messages, to one or more people whose names are pre-programmed into the risk management system, for notifications of this nature. For example, the recipients of such automated messages may include the risk manager, the project manager of the project affected by the impacted risk and in the case of catastrophic risks a CEO or other senior director of the company managing the project would in all probability also be automatically notified. Filters can be defined in the risk management system to control when such messages are sent. Examples of such filters include: risk category, cost or risk owner (the person responsible for managing the risk and any mitigating actions).

Figure 2:
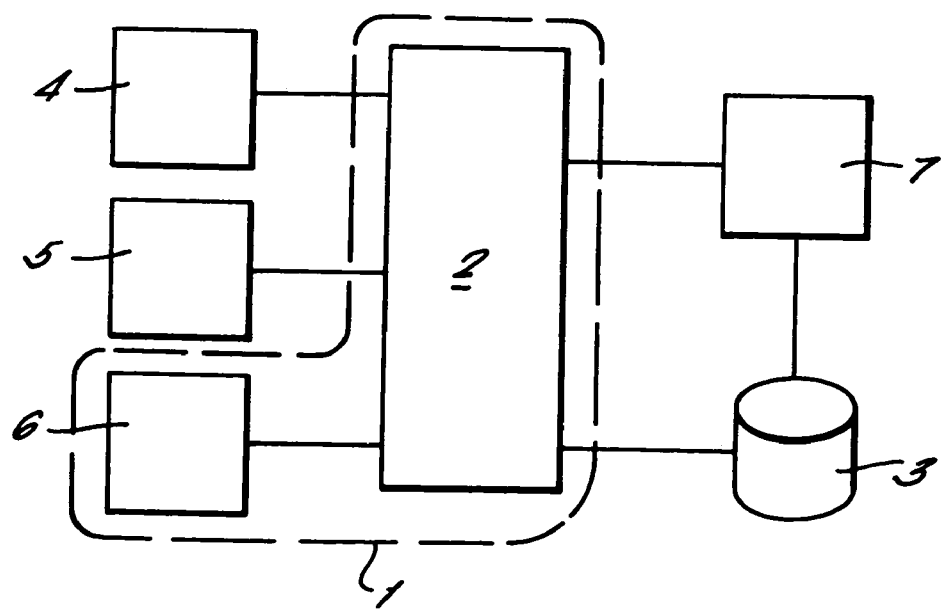
FIG. 2 is a schematic overview of the system architecture of an integrated project management and risk management system in accordance with the present invention.

In FIG. 2 an overview of the system architecture of an integrated project management and risk management system is shown. The system architecture comprises risk register and analysis functions implemented in a risk processor 2, an activity and risk data store 3, which ideally stores the data in a relational database, one or more project planning functions 4, requirements management applications 5, communications applications 6 and reporting applications 7. The risk processor 2 interfaces with each of the other system functions but the other system functions, with the exception of the reporting applications 7, may be limited to interfacing with the risk processor. The reporting applications 7 additionally interface directly with the activity and risk data store 3 so that data can be read from the data store and written into reports that are launched by the risk processor 2. Various components of the system architecture may be physically distributed in a variety of ways, for example using one, two or more computer systems or operating systems in communication with each other as appropriate.

The project planning functions 4, requirements management 5, communications applications 6 and the reporting applications 7 may all be external third-party applications with which the risk processor 2 is capable of interfacing and hence integrating into a centrally controlled combined project management and risk management system. For example, the project planning functions 4 may be implemented using MS Project™, the requirements management 5 may be implemented in QSS DOORS™, MS Outlook/Exchange™ may be utilised as the communications applications 6 and Seagate Crystal Reports™ may be utilised as the reporting application 1. The above commercially available applications only exemplify the type of third-party applications that may be implemented with the integrative risk management system described herein. As will be described below, the risk processor 2 is structured so as to maximise its interoperability and to reduce its dependency on any particular third-party package.

The risk processor 2 is preferably implemented as a web-based application, rather than a stand-alone executable application. This permits the client interface to be within a Web browser in which case the client side of the risk management system requires no special technology beyond a standard web browser. This is particularly beneficial in large-scale systems where there may be large numbers of workstations to be integrated into the system as the use of a web-based browser avoids the need to set-up and maintain client based software on all the workstations.

Figure 3:
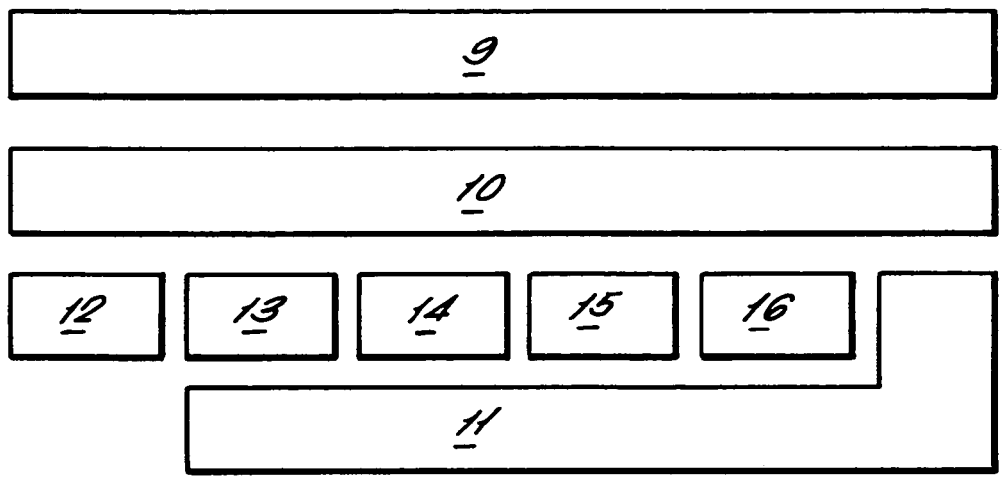
FIG. 3 schematically illustrates the interfaces between the various functions of the risk processor of FIG. 2.

The risk register and analysis functions, implemented in the risk processor 2, are organised into a series of layers as illustrated in FIG. 3. The purpose of this is to separate the different functionalities of data presentation 9, business logic 10 (risk management services), data store access 11 and interface services 12, 13, 14, 15, 16. This allows the business logic 10 to be preserved while porting one or more of the user interface 9, the data store access 11 and the external interfaces 12, 13, 14, 15, 16 to alternative technologies. The interface between each group of functionalities is in the form of component method invocations, with the interfaces between the layers being restricted to immediately adjacent layers. For example, functions in the presentation layer 9 may call functions in the risk management layer 10 but may not directly call to the lower layers which interface with external applications or the data access layer 11.

The presentation layer 9 consists of software for the presentation of risk management information in the form of a graphical user interface (GUI). The presentation layer 9 handles input to and output from the risk management services layer 10 and also performs formatting and validation on the input and output data. In a preferred form of the risk management system, the presentation layer 9 is implemented partly in HTML, or another mark-up language, which the user sees, and associated client-side scripting, and partly by server-side ASP scripts that generate the HTML commands.

The risk management services 10 implement the core business logic of the risk management system Functions in this layer correspond closely to the functions, that shall be described in greater detail below, of a conventional risk management system such as the addition and removal of risks, the display of information concerning a specific risk etc. These functions embody the business logic of the system, for example the way risk scoring calculations are performed as well as the ability to add, remove or modify risks.

The risk management functions are not able to access external systems (such as the project planning application) directly. Instead, interface functions are used. This isolates the core business logic from the concrete details of the various external applications with which the risk management system integrates. This means that changes to the external applications should not affect the risk management functions of layer 10, as any such changes are instead accommodated by the relevant interface. The risk management services 10 are able to access the data store by means of a data store access interface 11.

An e-mail interface 12 enables the risk management system to interact with users via e-mail using the communications applications 6. Such interactions may involve the notification to a user of risk or action assignments. The integrative risk management system provides an additional separate route for communicating with users via e-mail which shall be described in greater detail below.

A project planning interface 13 provides the interface to the external project planning functions 4. The project planning interface 13 enables the importation of work breakdown structures (as will be described below), the export of actions that are identified during the risk mitigation process and the processing of changes in the project plan.

A reporting interface 14 provides the ability to create reports using external reporting applications 7. This mainly involves launching a reporting application and passing to the application parameters to control filtering, sorting etc. The actual generation and formatting of reports is performed by the external reporting applications package 7 using the contents of the data store 3

Security services 15 provide authorisation facilities, governing the functions and data which are accessible to users. The security is implemented through a combination of environment features and application logic. In the client-server environment, which is the preferred environment for the risk management system, the security has three main aspects: authentication which ensures only valid clients are allowed to connect to the system; authorisation which ensures that clients are only allowed to perform authorised operations; and encryption, where needed. Such security provisions are well known and may be implemented through the operating platform of the risk management system.

A requirements interface 16 provides the interface to the requirements management applications 7.

The data store access interface 11 provides an access layer to the risk management database 3. This is preferably a generic interface through which to retrieve and update data but which acts to insulate the functionalities, that interface with the data access services, from the logical and physical implementation details of the database.

Figure 4:
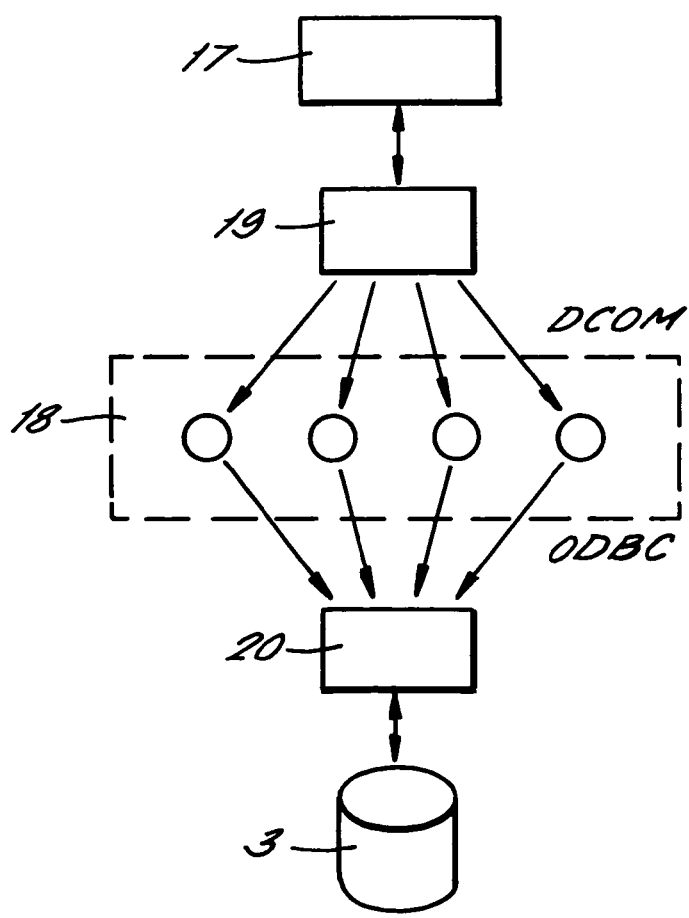
FIG. 4 illustrates a systems architecture for a risk management system in accordance with the present invention.

As mentioned above, the system architecture for the risk management system is ideally a three-tier, web-based client-server system as illustrated in FIG. 4. With this architecture the interface between the client 17 and the server 18 is based on standard HTML. Using ASP 19, web pages are dynamically generated to display the appropriate user interface as the client moves through the application. As mentioned earlier, no special technology is required on the client side apart from a standard web browser.

On the server side, the ASP scripts make use of a suite of COM or .NET components, which make up the bulk of the risk management system which, as mentioned above, is structured in a number of layers. At the lowest layer 11, the components access an SQL server or other type of database 20 via ODBC. All of the server side components preferably run within the framework of MTS or COM+ which provides transactional control for all service calls and so allows the components to be distributed across multiple machines, if required. Although the transactional framework extends to the ASP scripts as well as to the installed COM or .NET components with MTS or COM+, so that transactions could be handled within ASP script, it is preferred that all transactions be handled within the top-level components of the business logic layer 10. This ensures that if, at any time, the ASP layer were to be replaced with an alternative GUI, the components in the business logic layer would retain their integrity, With MTS or COM+ it is additionally possible to implement features such as 'object pooling' in the architecture of the client-server network.

Connection between the server and a browser based client workstation may conveniently utilise the HTTP connection, or a Secure HTTPS connection, with a TCP/IP connection for ODBC access where the client workstation is running a project management system such as MS Project. Thus, integration of the project management system with the risk management system can be achieved. The relationship between the project management system and the risk management system is described more fully below.

It should be noted that in order for the system to operate efficiently and to maximize throughput it is preferable for the relationship between client and server to be stateless. Conveniently the HTTP protocol provides a stateless relationship but this can be problematic where it is highly likely that almost always some state will need to be maintained from one page to the next. This is preferably achieved through the use of additional URL parameters and/or hidden HTML fields. However an alternative approach would include the use of cookies. Although of more relevance where the client and server are separated across a network, the adoption of a stateless relationship between client and server in a web server environment where the client and server are on the same machine is still preferable.

Integration with the project management system MS Project may be achieved through the use of a DBMS interface. This enables the risk management system 1 to directly read and update the underlying tables which store the project plan. The read interface allows MS Project plans, summary tasks and tasks to be linked in via the mapping table to form the activity breakdown structure. The update interface is used to insert mitigating actions back into the project plan. The MS Project plans can be stored in the same physical database as the risk management tables, This simplifies coding within the data access layer and enables queries to be performed spanning both the project management data and the risk management data. However, it is not essential for both sets of data to be stored in the same physical database and instead the project management data could be stored in a separate database remote from the risk management database. As mentioned earlier, where the MTS or COM+ framework is adopted, distributed transactions across two or more databases can be performed where necessary. This is particularly important where different project management systems are implemented at different remote sites.

Earlier it was mentioned that changes to the project management data could be detected through a mapping table. Additionally, in the case of MS Project, triggers can be added to the project database. When an event is triggered as a result of a change to the project database, the project plan is checked to establish whether the plan is one that has been imported into the risk management system. If not, no further action is taken. If the plan is one that has been imported then a row is inserted into the risk event queue which is allocated a unique identification code and whatever additional information is required to identify the event to be processed. Periodically the risk management system then polls the event queue to check for new events and where a new event is detected the risk management system determines the appropriate action to be taken e.g. to add or delete a project task.

The risk management system 1 is also capable of integrating with requirements management applications such as QSS DOORS. Requirements can either be defined locally with the risk management system or can be imported from the requirements management application. In the case of QSS DOORS, integration is performed using an import/export protocol for example using a comma separated variables (CSV) file as the current version of QSS DOORS holds data in a proprietary repository format.

Although reference has been made herein to the project management application MS Project, the integrative risk management system is intended to integrate with many different project management systems including but not limited to MS Project™ Primavera™ and Artemis™. Additionally, although reference is made herein to messages being sent by the risk management system by e-mail it will be apparent that other forms of automated messaging may alternatively be implemented including but not limited to SMS, pager and WAP Communication.

What is claimed is:

1. Risk management software embodied upon a computer-readable medium, the software comprising a set of instructions for the following steps to be performed when the software is executed:
   a) accessing, from a project data store, project data comprising a plurality of action identifiers in a nested arrangement, each of which identifies a separate action to be performed;
   b) analysing the project data to identify a plurality of activities, ordered in a nested arrangement, each activity being thereby linked to at least one of the actions, wherein to at least some of the plurality of activities which is assigned at least one risk indicator, the at least one risk indicator identifying consequences of a risk on the activity;
   c) on the basis of one or more mitigating tasks identified to reduce or prevent the risk or the consequences of the risk, outputting to the project data in the project data store one or more new action identifiers or alterations to existing action identifiers in the project data, and adjusting the nested arrangement of the action identifiers accordingly; and
   d) accessing changes to the project data and revising the plurality of activities in dependence on whether the changes are to action identifiers in the project data resulting from step c) above.

2. Risk management software as claimed in claim 1, wherein the changes to the project data are compared with new action identifiers or alterations to existing action identifiers previously output to the project data and where the changes to project data relate to action identifiers previously output to the project data no revisions are made to the plurality of activities.

3. Risk management software as claimed in claim 1, comprising the step of receiving a trigger from the project data when the project data has been changed.

4. Risk management software as claimed in claim 1, comprising the step of periodically polling the project data to determine whether changes have been made to the project data.

5. Risk management software as claimed in claim 1, comprising the further step of automatically outputting a message to one or more predetermined recipients.

6. Risk management software as claimed in claim 5, comprising the further step of automatically outputting a message to one or more predetermined recipients when the consequences of the risk are identified as exceeding a selected threshold.

7. Risk management software as claimed in claim 5, wherein the message is automatically output when the processor receives notice of an impacted risk.

8. Risk management software as claimed in claim 1, wherein the risk indicator comprises one or more of a cost allowance and a time allowance.

9. Risk management apparatus comprising a risk processor; means for linking the risk processor to a risk data store; a project data interface for linking the risk processor to a second store containing project data; and a program store containing a set of instructions for performing the following functions:
   a) accessing project data in the second store, the project data comprising a plurality of action identifiers in a nested arrangement, each of which identifies a separate action to be performed;
   b) analysing the project data to identify a plurality of activities, ordered in a nested arrangement, each activity being thereby linked to at least one of the actions, wherein to at least some of the plurality of activities is assigned at least one risk indicator, the at least one risk indicator identifying consequences of a risk on the activity, and storing the plurality of activities in the risk data store;
   c) on the basis of one or more mitigating tasks identified to reduce or prevent the risk or the consequences of the risk, outputting to the second store one or more new action identifiers or alterations to existing action identifiers in the project data, and adjusting the nested arrangement of the action identifiers accordingly; and
   d) accessing changes to the project data and revising the plurality of activities stored in the risk data store in dependence on whether the changes are to action identifiers in the project data resulting from step c) above.

10. Risk management apparatus as claimed in claim 9, wherein the risk data store and the second store utilise the same database.

11. Risk management apparatus as claimed in claim 9, further comprising a network interface for connecting to the second store when located at a remote site.

12. Risk management apparatus as claimed in claim 9, wherein the functionality of the apparatus is divided into at least three parts: a presentational part for managing the presentation of risk information to a user of the apparatus; a logic part for analysing the project data and for generating and updating the contents of the risk data store; and an interface part for enabling communication of the apparatus with external applications and wherein the presentational part and the interface part are restricted to only interfacing internally with the logic part.

13. Risk management apparatus as claimed in claim 12, wherein the apparatus includes a fourth part comprising a risk data store interface which is permitted to interface with both the logic part and the interface part.

14. A risk management method for storing and updating risk information, comprising the steps of:
   a) accessing, from a project data store, project data comprising a plurality of action identifiers in a nested arrangement, each of which identifies a separate action to be performed;
   b) analysing the project data to identify a plurality of activities, ordered in a nested arrangement, each activity being thereby linked to at least one of the actions, wherein to at least some of the plurality of activities is assigned at least one risk indicator, the at least one risk indicator identifying a consequence of a risk on the activity;
   c) on the basis of one or more mitigating tasks identified to reduce or prevent the risk or the consequences of the risk, outputting to the project data in the project data store one or more new action identifiers or alterations to existing action identifiers in the project data, and adjusting the nested arrangement of the action identifiers accordingly; and
   (d) accessing changes to the project data and revising the plurality of activities in dependence upon whether the changes are to action identifiers in the project data resulting from the step (c) above.

15. Integrated project management and risk management apparatus comprising:

a project data store containing a plurality of inter-related action identifiers in a nested arrangement, each of which identifies a separate project action;

a risk data store containing a plurality of inter-related project activities, ordered in a nested arrangement, each project activity being thereby being linked to at least one of said project actions, and a plurality of risk indicators associated with said project activities, each risk indicator identifying a consequence of a risk on the activity; and a risk processor in communication with said project data store and said risk data store, said risk processor being operable to:

read project action identifiers from said project data store;

read project activities and associated risk indicators from said risk data store;

generate and write to said risk data store changes to said project activities and risk indicators to reflect the project action identifiers read from the project data store;

generate or receive, and write to said risk data store, one or more mitigating activities identified to reduce or prevent the risk or the consequences of the risk associated with a project activity; and generate and write to the project data store one or more new project action identifiers, or alterations to existing project action identifiers, corresponding to the mitigating activities generated or received, and adjust the nested arrangement of the action identifiers accordingly.

16. The apparatus of claim 15 wherein the risk processor is operable to identify and thereby not to further process changes in the project data which were generated by the risk processor.

17. A method of operating an integrated project management and risk management apparatus comprising a project data store containing a plurality of inter-related action identifiers, each of which identifies a separate project action, a risk data store containing a plurality of inter-related project activities related to said project actions and a plurality of risk indicators associated with said project activities, each risk indicator identifying a consequence of a risk on the activity, and a risk processor in communication with said project data store and said risk data store, the method comprising the steps of operating said risk processor to:

read project action identifiers, which are in a nested arrangement, from said project data store;

read project activities and associated risk indicators from said risk data store, the project activities ordered in a nested arrangement, wherein each project activity is thereby linked to at least one of the project actions;

generate and write to said risk data store changes to said project activities and risk indicators to reflect the project action identifiers read from the project data store;

generate or receive, and write to said risk data store, one or more mitigating activities identified to reduce or prevent the risk or the consequences of the risk associated with a project activity; and generate and write to the project data store one or more new project action identifiers, or alterations to existing project action identifiers, corresponding to the mitigating activities generated or received, and adjust the nested arrangement of the project action identifiers accordingly.

18. A computer program product embodied on a computer-readable medium, the program product being for use in an integrated project management and risk management apparatus, and comprising:

a project data store containing a plurality of inter-related action identifiers in a nested arrangement, each of which identifies a separate project action;

a risk data store containing a plurality of project activities, ordered in a nested arrangement, each project activity being thereby being linked to at least one of said project actions and a plurality of risk indicators associated with said project activities, each risk indicator identifying a consequence of a risk on the activity;

and a risk processor in communication with said project data store and said risk data store, said computer program product comprising computer program instructions which, when executed by said risk processor, carry out the steps comprising:

reading action identifiers from said project data store;

reading project activities and associated risk indicators from said risk data store;

generating and writing to said risk data store changes to said project activities and risk indicators to reflect the action identifiers read from the project data store;

generating or receiving, and writing to said risk data store, one or more mitigating activities identified to reduce or prevent the risk or the consequences of the risk associated with a project activity; and generating and writing to the project data store one or more new action identifiers, or alterations to existing action identifiers, corresponding to the mitigating activities generated or received, and adjusting the nested arrangement of the action identifiers accordingly.

* * * * *